United States Patent [19]

Weisz et al.

[11] Patent Number: 5,332,182

[45] Date of Patent: Jul. 26, 1994

[54] ADJUSTABLE LEVELING FOOT ASSEMBLY

[75] Inventors: Sandor F. Weisz, Stamford; Thomas J. Pendleton, Danbury; David A. Demar, Trumbull, all of Conn.

[73] Assignee: Pitney Bowes Inc., Stamford, Conn.

[21] Appl. No.: 43,693

[22] Filed: Apr. 8, 1993

[51] Int. Cl.$^5$ .................................. F16M 11/24
[52] U.S. Cl. .................................... 248/188.4
[58] Field of Search ............. 248/188.4, 188.2, 188.9, 248/649, 650

[56] References Cited

U.S. PATENT DOCUMENTS

| | | | |
|---|---|---|---|
| 4,219,089 | 8/1980 | Gard et al. | 177/165 |
| 4,479,561 | 10/1984 | Feinland et al. | 177/154 |
| 4,690,365 | 9/1987 | Miller et al. | 248/650 |
| 4,991,805 | 2/1991 | Solak et al. | 248/188.4 |
| 5,000,416 | 3/1991 | Fantasia | 248/650 |
| 5,141,190 | 8/1992 | Wu | 248/188.4 |

Primary Examiner—Ramon O. Ramirez
Attorney, Agent, or Firm—Robert H. Whisker; Melvin J. Scolnick

[57] ABSTRACT

Apparatus is provided for adjustably leveling a machine base, such as a postal scale, wherein the machine base does not have to be turned over to accomplish the leveling adjustment. The apparatus includes a threaded support shaft having a non-circular configuration at one end and a leveling wheel having a threaded passage capable of receiving and mating with the threaded support shaft. A retaining structure is capable of retaining the rotational movement of the threaded support shaft and is capable of restricting movement of the threaded support shaft relative to the base.

12 Claims, 2 Drawing Sheets

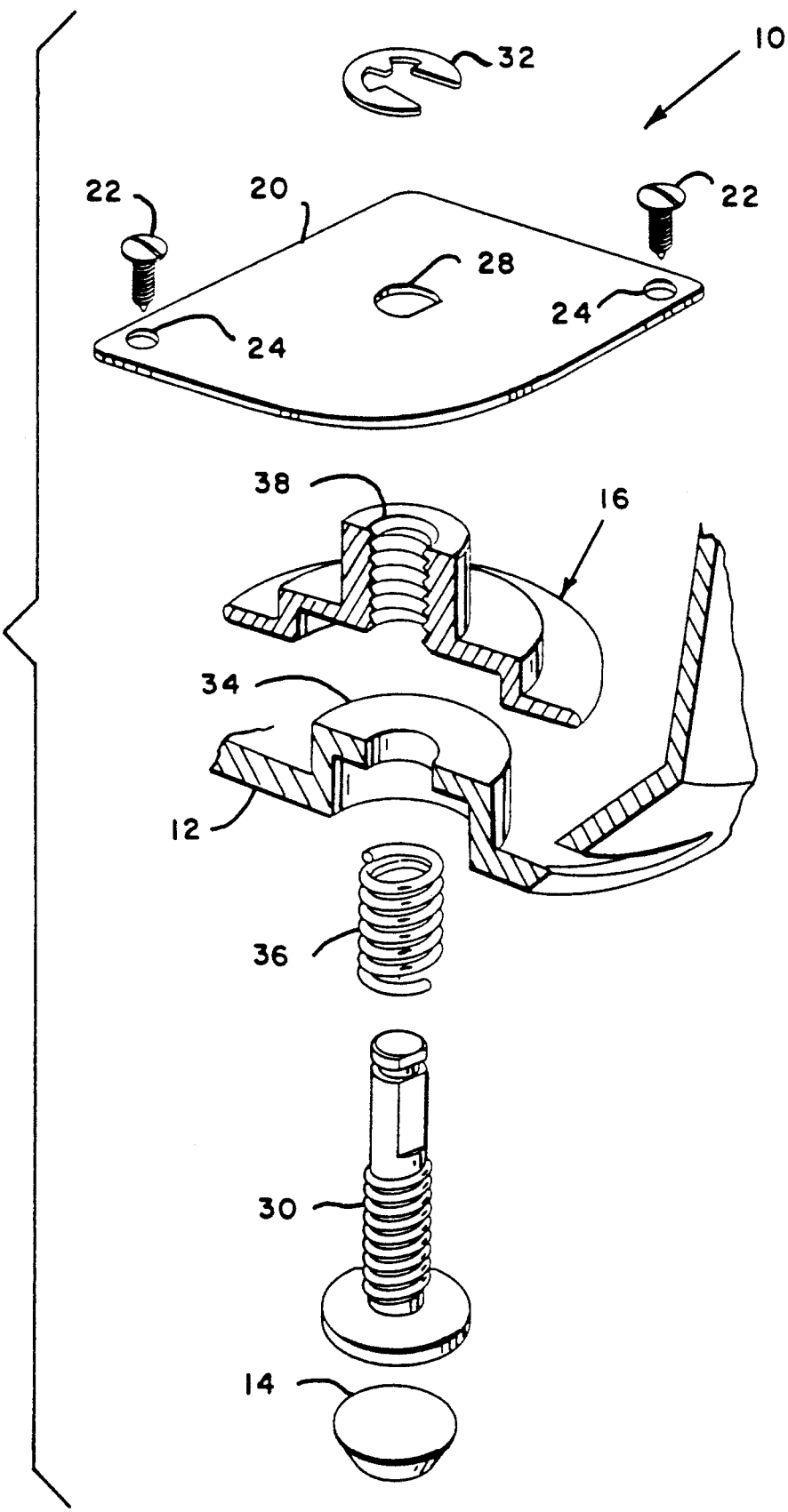

ADJUSTABLE LEVELING FOOT ASSEMBLY

BACKGROUND OF THE INVENTION

This invention relates to an adjustable leveling foot assembly which is capable of varying support on the underside of a housing. More particularly, this foot assembly is provided for purposes of leveling a postal scale.

When placing items, for example envelopes or packages, on top of a postal scale it is desirable that the weighing platform be level so as not to encourage slippage or movement of the mailpiece while atop the platform. Leveling is also desirable in order to provide a strictly normal force on the postal scale load cell transducer thereby avoiding errors due to any horizontal components. Often at the underside of a scale housing is located a plurality of leveling feet for the purpose of leveling the upper top portion of the housing.

U.S. Pat. No. 4,219,089 discloses leveling feet which are on threaded shafts and received at the base of the housing. Typically when adjusting the feet for leveling in these prior art systems, the user must turnover the housing to reduce the weight pressure on the feet in order to turn the feet in the desired direction to adjust the height of the feet. Adjusting of the feet typically becomes a trial and error process which can lead to numerous overturns of the housing until satisfactory leveling is achieved.

Numerous overturns of the housing being made over time is detrimental to the electronic circuitry, displays, and the like which comprise parts of the scale unit. Long-term stability and accuracy of these parts is reduced.

Assuming adjustment of the feet is sought in this prior art system without overturning the housing unit, weight pressure will produce strain on each of the feet rendering it difficult to easily rotate the feet. Additionally, the access to such feet in order to rotate is difficult and time-consuming depending upon the relative location of the feet in proximity to the periphery of the housing.

It is therefore an object of the present invention to provide a leveling foot assembly which permits the user to easily and quickly adjust the desired height of each foot.

SUMMARY OF THE INVENTION

According to the invention, the above object is achieved and the disadvantages of the prior art are overcome by an apparatus for providing adjustable level support for a base, the apparatus comprising a threaded support shaft having a non-circular configuration at one end, a leveling wheel having a threaded passage capable of receiving and mating with the threaded support shaft, a retaining structure capable of retaining the rotational movement of the threaded support shaft and capable of restricting movement of the threaded support shaft relative to the base.

Other objects and advantages of the subject invention will be apparent to those skilled in the art from consideration of the attached drawings and of the detailed description set forth below.

BRIEF DESCRIPTION OF THE DRAWINGS

FIG. 3 is an exploded view of an alternate embodiment of the present invention.

DETAILED DESCRIPTION OF THE INVENTION

Figure 2:
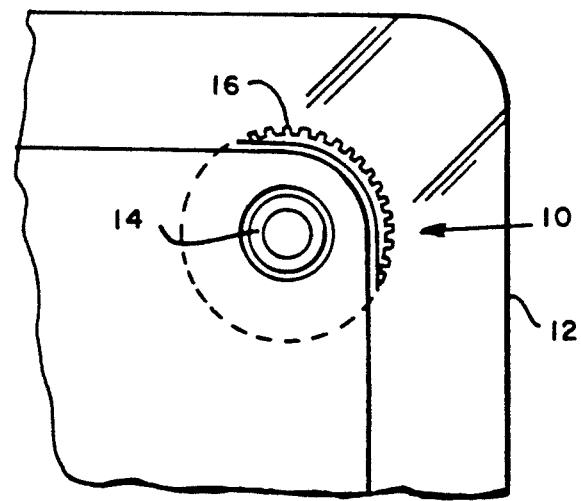
FIG. 2 is a partial bottom view of the housing of FIG. 1.

In FIG. 2 herein, a bottom view appears of a preferred form of adjustable leveling assembly 10 as will be seen from the outside of housing 12. Only the bottom of foot 14 and a portion of the perimeter of leveling wheel 16 are preferably revealed outside of the housing. It is contemplated that a plurality of these assemblies 10 will be used for leveling of housing 12.

Figure 1:
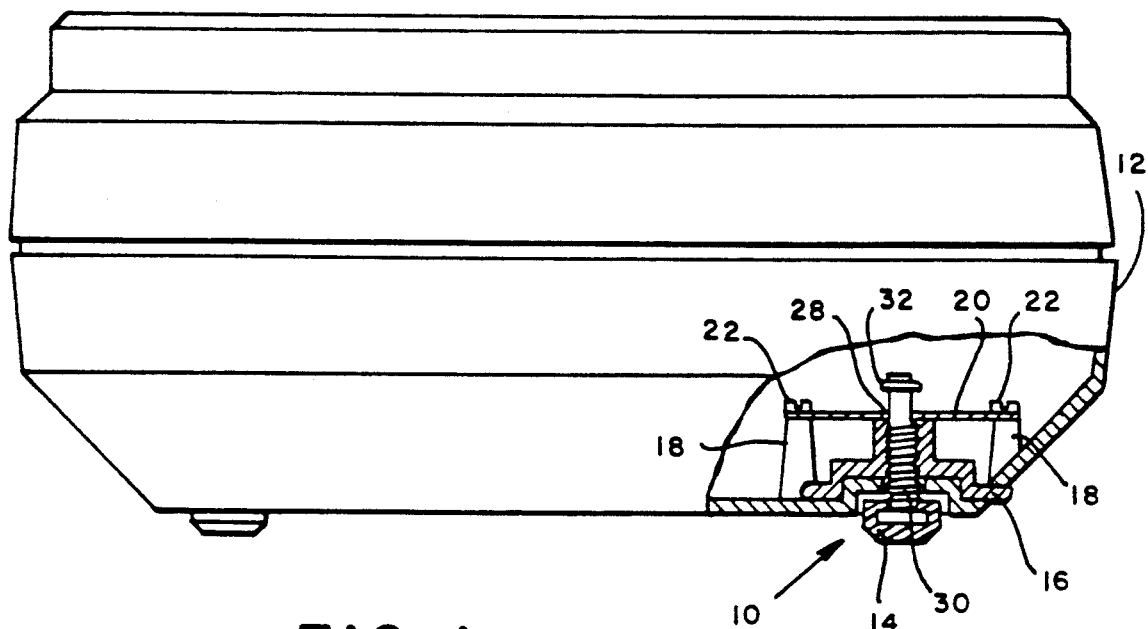
FIG. 1 is a front view of a housing in accordance with the present invention with a portion broken away to show the adjustable leveling foot assembly.

Referring now to FIG. 1 and FIG. 3, the relationship between the components of leveling assembly 10 can be better appreciated. Formed at the interior base portion of housing 12 are mounting supports 18 which are used to support retaining plate 20 and into which screws 22 are received to secure retaining plate 20. Formed in retaining plate 20 is screw openings 24 which are positioned for alignment over mounting supports 18 to permit easy access of screws 22 for securing retaining plate 20. Alternatively, it is contemplated that a snap together assembly of components would be used for holding retaining plate 20 to the mounting supports 18, thus eliminating the need for screws 22. Also formed in the substantially central portion of retaining plate 20 is aperture 28 for receiving therein the keyed end of threaded shaft 30. Aperture 28 is generally circular with a straight edge cut out of the circle and is dimensioned in order to mate with the keyed end of threaded shaft 30. Threaded shaft 30 is secured from rotational movement due to the configuration of the aperture 28 and the keyed end of threaded shaft 30. It is contemplated that other configurations may be used for the shape of the aperture 28 or keyed end of shaft 30 such as a star or square shape. Additionally, threaded shaft 30 is secured from vertical movement through retaining plate 20 by retaining clip 32. The base portion of threaded shaft 30 is supported by foot 14 which is preferably of an energy absorbing material as described in U.S. Pat. No. 4,479,561 to Feinland et al. Foot 14 may be applied with adhesive to shaft 30 (FIG. 1 and FIG. 3) or foot 14 may alternatively enclose or surround the base portion of shaft 30.

Housing 12 includes a generally cylindrical sleeve 34 therein to receive threaded shaft 30. In an alternate embodiment, spring 36 is placed between shaft 30 and sleeve 34 in order to counter any downward rotational movement leveling wheel 16. Leveling wheel 16 saddles over sleeve 34 which projects upward in the housing thus inhibiting horizontal movement of leveling wheel 16 within the housing. Formed within leveling wheel 16 is a threaded passage 38 for receiving threaded shaft 30. As the leveling wheel 16 is rotated in a selected or predetermined direction it will move in an upward or downward direction along the threaded shaft 30 thereby either lowering or elevating the portion of housing 12 being supported by leveling assembly 10.

It will be apparent that variations and modifications may be made in the subject invention and it is therefore intended in the following claims to cover each such variation and modification as falls within the true spirit and scope of the invention.

What is claimed is:

1. An apparatus for providing adjustable level support for a base, said apparatus comprising:

a threaded support shaft;

a leveling wheel having a threaded passage for receiving and mating with said threaded support shaft and having a bearing surface for supporting said base wherein when said leveling wheel is rotated, said leveling wheel and said base move in a vertical plane with respect to said support shaft; and a retaining means for preventing the rotational movement of said shaft.

2. Apparatus as specified in claim 1 further comprising:

a spring adapted to receive said shaft therein, said spring preventing an otherwise excessive rotational movement of said leveling wheel in a predetermined direction on said shaft.

3. Apparatus as specified in claim 1 or 2, wherein at least one end of the shaft is configured in its periphery with at least one substantially flat surface.

4. Apparatus as specified in claim 1 or 2, wherein said retaining means further comprises at least one mounting support and a retaining plate, said retaining plate receiving one end of said shaft and fixed to said mounting supports, while preventing rotation of said shaft and allowing axial movement of said shaft.

5. Apparatus as specified in claim 4, wherein said mounting support and said retaining plate are snap-together parts.

6. Apparatus as specified in claim 1 or 2, further comprising a foot at one end of said threaded support shaft, said foot being formed of an energy absorbing material.

7. A housing supported by one or more adjustable leveling supports, said leveling supports comprising:

a threaded support shaft;

a leveling wheel having a threaded passage for receiving and mating with said threaded support shaft and having a bearing surface for supporting said housing wherein when said leveling wheel is rotated, said leveling wheel and said housing move in a vertical plane with respect to said support shaft; and a retaining means for preventing the rotational movement of said shaft.

8. Apparatus as specified in claim 7 further comprising:

a spring adapted to receive said shaft therein, said spring preventing an otherwise excessive rotational movement of said leveling wheel in a predetermined direction on said shaft.

9. Apparatus as specified in claim 7 or 8, wherein at least one end of the shaft is configured in its periphery with at least one substantially flat surface.

10. Apparatus as specified in claim 7 or 8, wherein said retaining means further comprises at least one mounting support and a retaining plate, said retaining plate receiving one end of said shaft and fixed to said mounting supports, while preventing rotation of said shaft and allowing axial movement of said shaft.

11. Apparatus as specified in claim 10, wherein said mounting support and said retaining plate are snap-together parts.

12. Apparatus as specified in claim 7 or 8, further comprising a foot at one end of said threaded support shaft, said foot being formed of an energy absorbing material.

* * * * *